(12) United States Patent
Porter et al.

(10) Patent No.: US 6,327,305 B1
(45) Date of Patent: Dec. 4, 2001

(54) METHOD AND APPARATUS FOR ENCODING A STREAM OF DATA BLOCKS

(75) Inventors: Allen J. Porter, Thornhill; David A. Strasser, Toronto; Paul Chow, Richmond Hill, all of (CA)

(73) Assignee: ATI Technologies, Inc., Ontario (CA)

( * ) Notice: Subject to any disclaimer, the term of this patent is extended or adjusted under 35 U.S.C. 154(b) by 0 days.

(21) Appl. No.: 09/064,700

(22) Filed: Apr. 22, 1998

(51) Int. Cl.$^7$ ............................... H04B 1/66; H04N 7/12
(52) U.S. Cl. ........................................ 375/240.13
(58) Field of Search .................................. 348/714, 715, 348/416.1, 409.1, 405.1; 375/240, 240.13, 240.14, 240.7, 240.15, 240.16, 240.17; H04N 7/12; H04B 1/66

(56) References Cited

U.S. PATENT DOCUMENTS

| | | | |
|---|---|---|---|
| 5,952,943 | * 9/1999 | Walsh et al. | 341/50 |
| 6,005,625 | * 12/1999 | Yokoyama | 348/416 |
| 6,026,217 | * 2/2000 | Adiletta | 395/200 |
| 6,108,449 | * 8/2000 | Sekiguchi et al. | 382/236 |
| 6,122,320 | * 9/2000 | Bellifemine et al. | 375/240 |
| 6,122,442 | * 9/2000 | Purcell et al. | 395/118 |

* cited by examiner

Primary Examiner—Chris Kelley
Assistant Examiner—Tung Vo
(74) Attorney, Agent, or Firm—Vedder, Price, Kaufman & Kammholz

(57) ABSTRACT

A method and apparatus for encoding a stream of data blocks begins when a stream of data blocks is received. The stream of data blocks may include a plurality of sequences of data blocks. The encoding process then continues by storing a first grouping of data blocks of a first sequence in non-local memory. Having stored the first grouping in non-local memory, one of the data blocks is retrieved from the non-local memory. The retrieved data block is then encoded utilizing a working section of local memory based on a relational data encoding convention. Next, the encoding process retrieves a second data block of the first grouping of data blocks from the non-local memory. In addition, portions of the first data block will be retrieved from the non-local memory and provided to a reference section of local memory. The second data block is then encoded in a working section of local memory based on the portions of the first data block and the relational data encoding convention.

18 Claims, 9 Drawing Sheets

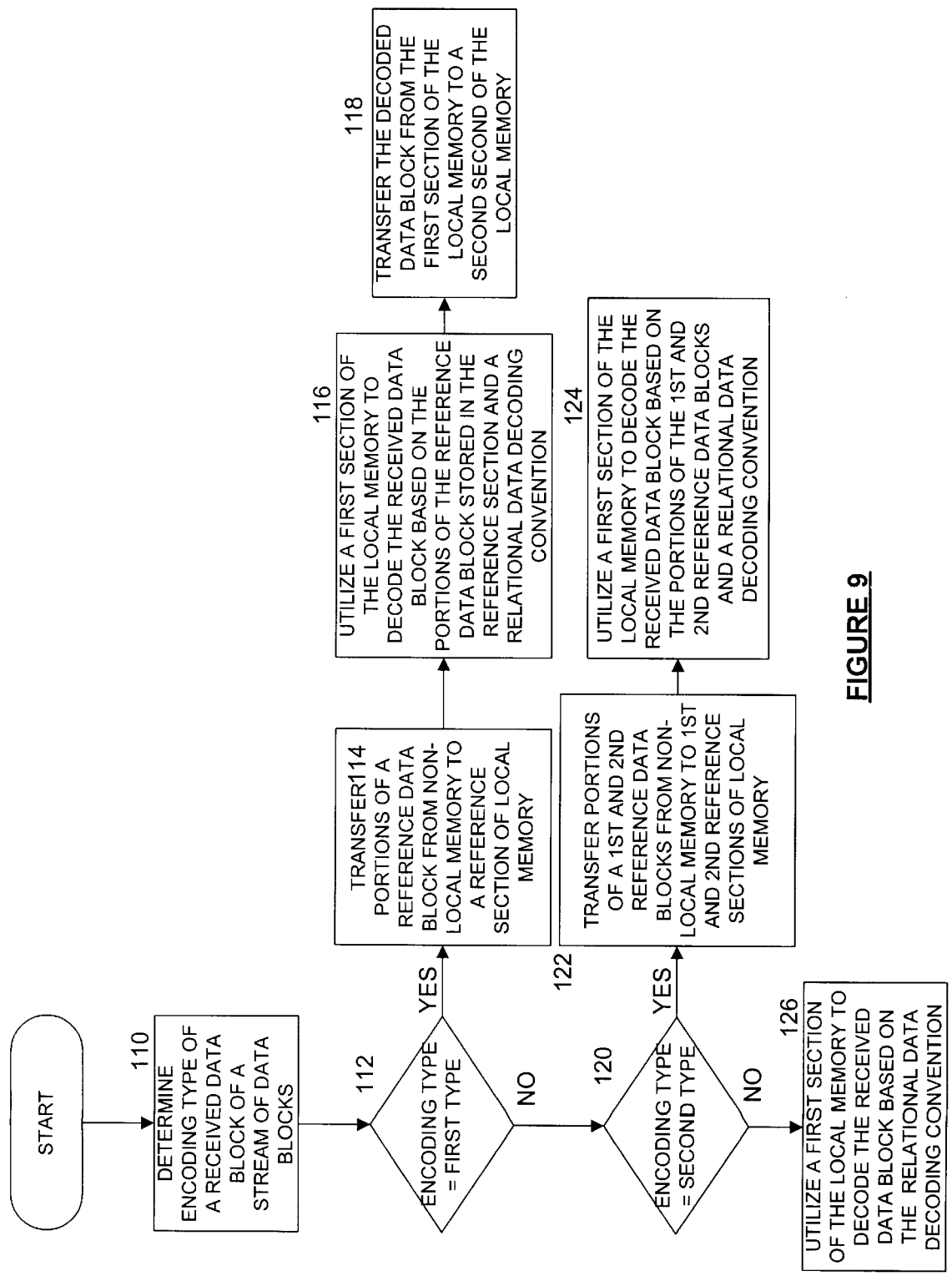

METHOD AND APPARATUS FOR ENCODING A STREAM OF DATA BLOCKS

TECHNICAL FIELD OF THE INVENTION

The present invention relates generally to data processing and more particularly to decoding of processed data.

BACKGROUND OF THE INVENTION

Data processing can be done in a variety of ways by a variety of data processing entities. For example, computers, via a central processing unit and associated co-processors, process data to execute applications. Applications may include word processing applications, drawing applications, presentation applications, spreadsheet applications, video applications, video game applications, etc. As another example of data processing, televisions process data to render received modulated signals into video images. As such, signals provided by DVD players, VCRs, camcorders, etc. can all be processed by a television to produce the video images. As yet another example of data processing, a computer may include a television decoder to perform similar data processing functions as a television.

As the amount of data being processed increases, the processing speed and memory capacity of the processing device needs to increase accordingly. As an alternate to, or in addition to, increasing the processing speed and memory, the data may be compressed, such that the data is represented by a smaller amount of compressed data. By compressing data, processing entities may effectively process more data in a given time. In addition, storage of compressed data takes considerably less memory than uncompressed data. For example, video data that has been encoded in accordance with the motion picture expert group ("MPEG") standard can be stored on a smaller storage medium than uncompressed video. The MPEG standard requires that video data be compressed based on motion compression, which utilizes time related frames of video to compress a particular frame of video. For example, a current frame may be encoded based on a previous frame and a subsequent frame. In addition, motion compensation encodes frames based on the differences between the relational frames. As such, one frame needs to be encoded based on the MPEG encoding convention, and then other frames relating to that frame are encoded based on the differences from that frame.

Decoding of MPEG encoded video data frames requires four memory locations, one for each related frame. The four full-frame memory buffers store two referenced images, the current image being rendered, and the decoded video data being presented to a display driver. For a display of 720×480 pixels, the four buffers consume approximately 2 megabits of memory. As the display resolution increases, for example to 1920 to 1080, the four full-frame buffers would require approximately 8 megabits of storage capacity. When memory requirements are increased by a factor of 2 or more, the overall die size of an integrated video graphics circuit increases substantially, which correspondingly increases the cost of integrated video graphics circuits.

Therefore, a need exists for a method and apparatus that reduces the memory requirements for encoding and/or decoding of data blocks, and in particular for data blocks containing video information.

BRIEF DESCRIPTION OF THE DRAWING

FIG. 9 illustrates a logic diagram of a method for decoding data blocks in accordance with the present invention.

DETAILED DESCRIPTION OF A PREFERRED EMBODIMENT

Generally, the present invention provides a method and apparatus for encoding a stream of data blocks. The encoding process begins when a stream of data blocks is received. The stream of data blocks may include a plurality of sequences of data blocks. The encoding process then continues by storing a first grouping of data blocks of a first sequence in non-local memory. Having stored the first grouping in non-local memory, one of the data blocks is retrieved from the non-local memory. The retrieved data block is then encoded utilizing a working section of local memory based on a relational data encoding convention. Next, the encoding process retrieves a second data block of the first grouping of data blocks from the non-local memory. In addition, portions of the first data block will be retrieved from the non-local memory and provided to a reference section of local memory. The second data block is then encoded in a working section of local memory based on the portions of the first data block and the relational data encoding convention. With such a method and apparatus, data blocks may be encoded in a data processing system with minimal memory requirements. The memory requirements are reduced in that only one full frame buffer is needed for the currently encoded data block while the referenced data block or data blocks may be stored in a partial frame buffer of local memory.

Figure 1:
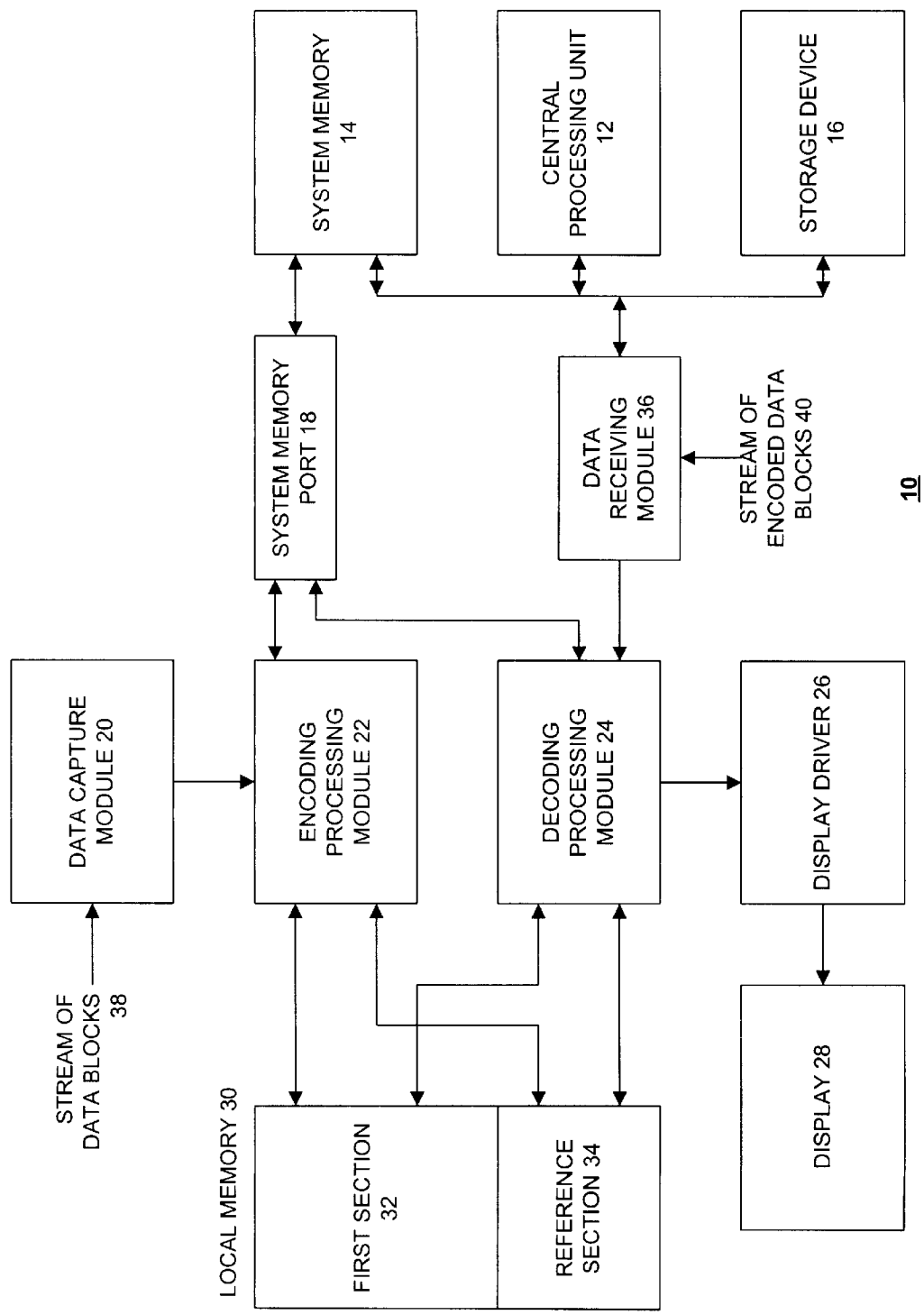
FIG. 1 illustrates a schematic block diagram of a data processing system in accordance with the present invention.

The present invention can be more fully described with reference to FIGS. 1 through 9. As one of average skill in the art will appreciate, FIGS. 1 through 9 along with the accompanying text, provide an enabling description of at least one preferred embodiment of the present invention. As one of average skill in the art will further appreciate, other embodiments may be readily derived from the teachings of the present invention without deviating from the spirit of the present invention. FIG. 1 illustrates a schematic block diagram of a data processing system 10 that includes a central processing unit 12, system memory 14, a storage device 16, a system memory port 18, a data capture module 20, an encoding module 22, a decoding module 24, a display driver 26, a display 28, and local memory 30. Note that the data processing system 10 may omit the decoding module 24, the display driver 26 and the display 28 if the data processing system 10 is to function purely as a data block encoder. Alternatively note that the encoding module 22 and the data capture module 20 may be omitted if the data processing system 10 is to only include the decoding function.

The central processing unit 12 may be the central processing unit of a personal computer, workstation, personal digital assistant (PDA), hand-held computer, and/or an integrated circuit such as a microprocessor, digital signal processor, micro-controller, micro-computer and/or any other device that manipulates digital information based on programming instructions. The system memory 14 may be hard drive memory, floppy disk memory, random access memory, read-only memory, external memory and/or any other device that stores digital information. The storage device 16 may include a writable CD drive, floppy disk memory, zip drive, magnetic tape memory, and/or any internal or external memory device that may be coupled to a central processing unit. The system memory port 18 may be an advance graphics port (AGP) which allows the encoding module 22 and the decoding module 24 to access the system memory 14. Note that the encoding module 22 and/or the decoding module 24 may be incorporated in a video graphics circuit.

In an encoding mode, the data processing system 10 receives a stream of data blocks 38 via the data capture module 20. The data capture module 20 may be a camcorder, a DVD player, a VCR, a television tuner and/or any other device that receives digital information. Upon receiving the stream of data blocks, the data capture module 20 provides them to the encoding module 22. The encoding module 22 utilizes first section 32 and the reference section 34 of local memory 30 to encode the stream of data blocks. The encoded data blocks are then provided to the system memory 14 and/or the storage device 16 under the control of the central processing unit 12. The details of the encoding process will be discussed subsequently with reference to FIGS. 2 through 7.

In the decoding mode, the data processing system 10 receives a stream of encoded data blocks 40 via a data receiving module 36. Alternatively, the data receiving module 36 may receive the stream of encoded data blocks 40 from the system memory 14, or the storage device 16 as directed by the central processing unit 12. If the data receiving module 36 is receiving the stream of encoded data blocks 40 from an external source, the external source may be a DVD player, a CD ROM storing MPEG encoded video images, or any other device that stores relationally encoded data. Upon receiving the stream of encoded data blocks 40, the decoding module 22 utilizes the first section 32 and the reference section 34 of local memory 30 along with the system memory 14 to decode the encoded data blocks 40. The decoded data blocks are then provided to the display driver 26, which provides pixel information to the display 28 such that the decoded data blocks may be presented on the display 28. The decoding process will be discussed in greater detail below with reference to FIGS. 2 and 3 and FIGS. 8 and 9.

Figure 2:
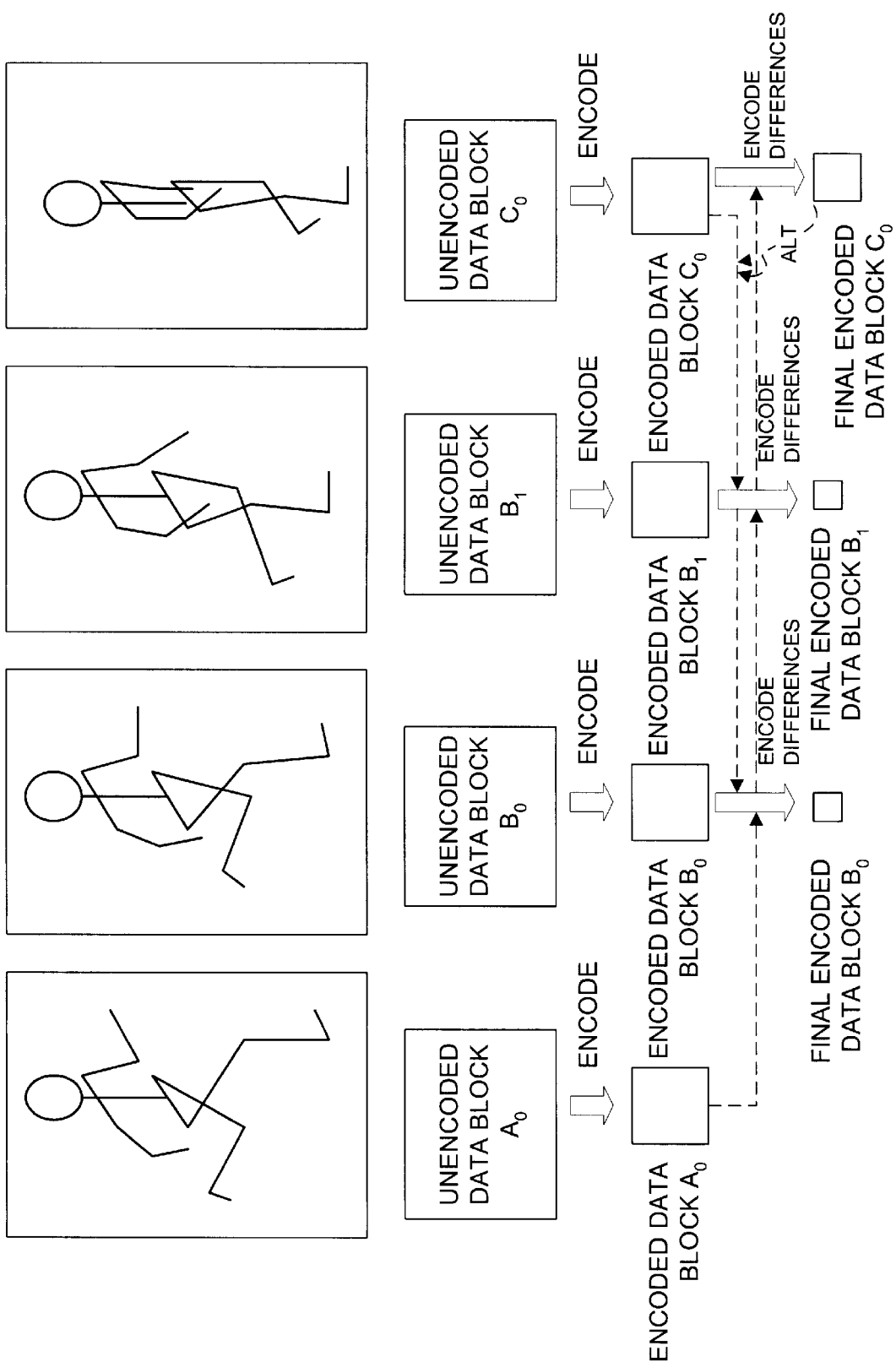
FIG. 2 illustrates a graphical representation of encoding data blocks in accordance with the present invention.

FIG. 2 illustrates a graphical representation of a relational encoding scheme. Note that, while the majority of the discussion relating to FIG. 2 will focus on the relational encoding scheme, FIG. 2 fully illustrates the corresponding decoding process. As one of average skill in the art will appreciate, the decoding process is the inverse of the encoding process and can be readily derived from the discussion of the encoding process.

FIG. 2 illustrates four unencoded data blocks $A_0$, $B_0$, $B_1$, and $C_0$ that are representative of video images. The unencoded data block $A_0$, represents a first video frame of a stick figure in full stride. The unencoded data block $B_0$ represents a video frame of the stick figure beginning to slow its run. The unencoded data block $B_1$ represents another video frame in which the stick figure is further slowing its run. The unencoded data block $C_0$ represents a video frame of the stick figure moving at a walking pace. Having received these four related video frames from a stream of video images, or a stream of data video blocks, the grouping of video images may be encoded. The encoding convention pictured in FIG. 2 has each of the unencoded data blocks $A_0$, $B_0$, $B_1$, and $C_0$ being separately encoded to produce encoded data blocks. For example, unencoded data block $A_0$ may be encoded to produce encoded data block $A_0$, unencoded data block $B_0$ may be encoded to produce encoded data block $B_0$, etc. The encoding convention used may be a scaling process (i.e., the video frame is shrunk such that it is represented by fewer data elements), or some other encoding convention.

The encoded data block $A_0$ may then be further used to encode the encoded data block $C_0$. In this further encoding, the final encoded data block $C_0$ contains information that defines the differences between the encoded data block $A_0$ and the encoded data block $C_0$. As graphically illustrated, the final encoded data block $C_0$ requires less information to represent it than the encoded data block $C_0$.

The final encoded data block $B_0$ and the final encoded data block $B_1$ may be encoded based on the differences between the final encoded data block $C_0$ and the encoded data block $A_0$. As shown by encoding in this manner, the final encoded data blocks $B_0$ and $B_1$ require even less data to represent the encoded data blocks.

Figure 3:
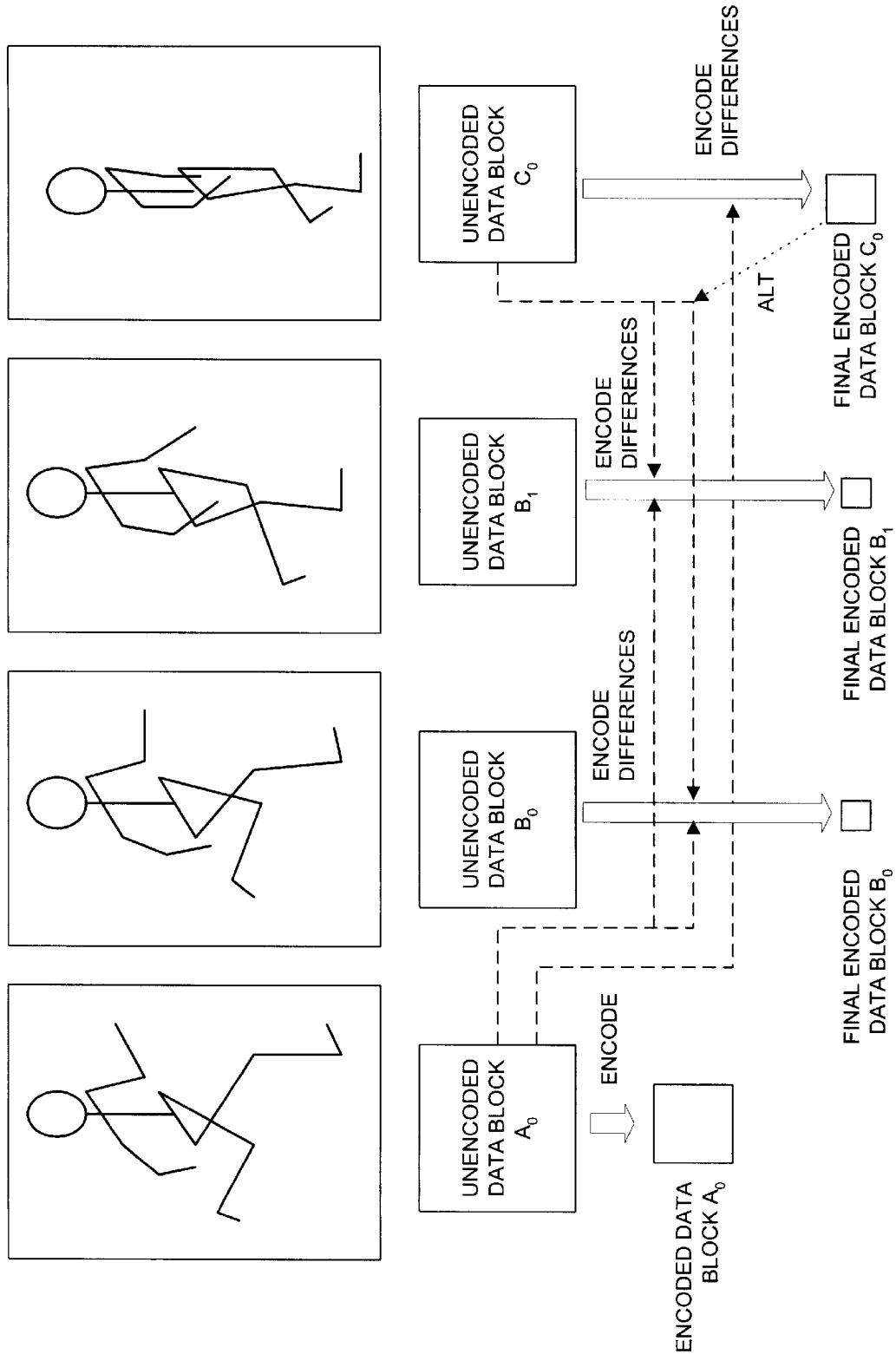
FIG. 3 illustrates a graphical representation of an alternate data block encoding scheme in accordance with the present invention.

FIG. 3 illustrates a graphical representation of an alternate encoding convention. The encoding convention shown in FIG. 3 is more representative of the MPEG encoding convention. As shown, unencoded data block $A_0$ represents a first video frame, unencoded data block $B_0$ represents a second frame of video data, unencoded data block $B_1$ represents a third data block of video data, and unencoded data block $C_0$ represents a fourth data block of video data. As shown, the unencoded data block $A_0$ is directly encoded to produce encoded data block $A_0$. The encoding convention used may be comparable to that utilized in the MPEG 2 encoding convention. To encode data block $C_0$, the differences between data block $C_0$ and $A_0$ are encoded. The encoded differences are represented by final encoded data block $C_0$. To encode data block $B_0$, the differences between data block $A_0$ and data block $B_0$, and the differences between data block $C_0$ and $B_0$ are encoded to produce the final encoded data block $B_0$. The final encoded data block $B_1$ is encoded based on the differences between data block $A_0$ and data block $B_1$ and the differences between data block $B_1$ and data block $C_0$.

As one of average skilled in the art will appreciate, the encoded data blocks $A_0$, $B_0$, $B_1$, and $C_0$ may be decoded in the reverse process of the encoding process shown in FIGS. 2 and 3. As such, when the decoding process is discussed in greater detail below with reference to FIGS. 8 and 9, the decoding conventions described will be decoding processes corresponding to the encoding processes of FIGS. 2 and 3.

Figure 4:
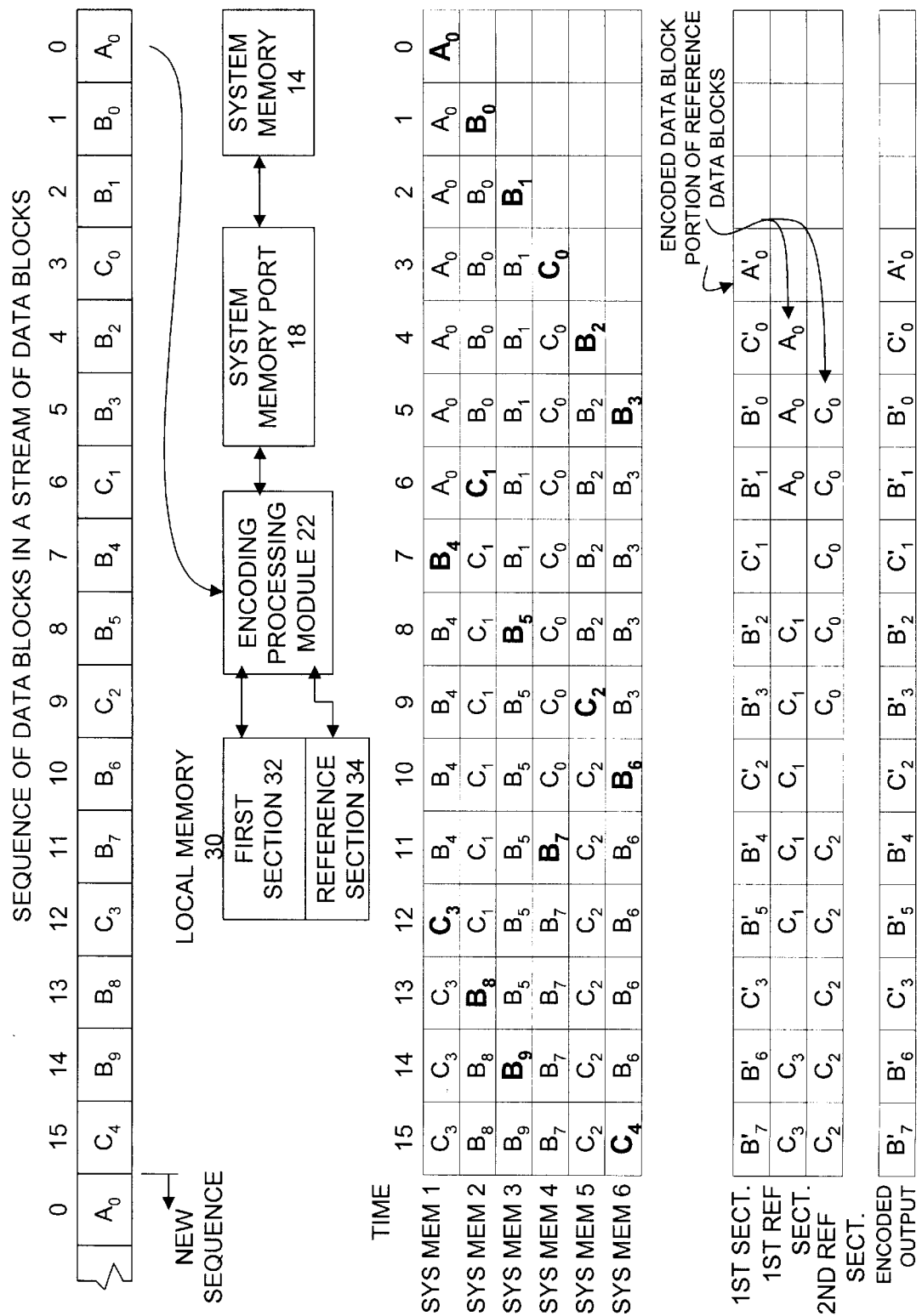
FIG. 4 illustrates memory utilization during an encoding process in accordance with the present invention.

FIG. 4 illustrates a schematic block diagram of an encoding circuit that includes the encoding processing module 22, the local memory 30, the system memory port 18 and the system memory 14. Note that the encoding processing module 22 may be a video graphics co-processor, a stand-alone integrated circuit such as a micro-processor, micro-computer, microcontroller, digital signal processor, and/or any device that manipulates digital information based on programming instructions. In addition, the encoding processing module 22 may be incorporated into the central processing unit 12. Regardless of construct, the encoding processing module 22 receives a sequence of data blocks in a stream of data blocks. As shown, the sequence of data blocks includes 16 data blocks. The sequence of data blocks then repeats every 16 data blocks. If the data blocks are representative of MPEG video data blocks, $A_0$ would be representative of an I video frame, while the B data blocks would be representative of B MPEG video frames and the C data blocks would be representative of P MPEG video frames. To encode a sequence of 16 data blocks, 6 full-frame memory sections are needed in the system memory 14. In addition, the first section 32 of the local memory 30 includes sufficient memory locations to store a full frame of video data. The reference section 34 includes a first reference section and a second reference section, each of which includes memory locations to store a portion of a full frame of video data.

The encoding process begins by storing a group of the sequence of data blocks in the system, or non-local, memory 14. The grouping of data blocks includes data blocks $A_0$, $B_0$, $B_1$, and $C_0$. Once these data blocks are stored in the system memory over the first four time intervals, the encoding of $A_0$ begins. Note that the system memory is shown to include six memory locations, 1–6, and the corresponding data blocks that each location stores at various time intervals. Further note that the local memory 30 is shown to include three sections (the first section 32 and two reference sections) and the corresponding data blocks that each location stores at the various time intervals. As such, at time 0, when data block $A_0$ is received, it is stored in the system memory section 1. At the next time interval (time 1), the second data block $B_0$ is written into the second system memory location. As shown, $A_0$ remains in the first memory section for time interval 1. At the second time interval, data block $B_1$ is written into the third memory section while the first and second system memory sections maintain their data. The fourth data block $C_0$ is written into the fourth system memory at time interval 3.

With the first grouping of data blocks stored in the system memory via the system memory port 18, data block $A_0$ may be encoded utilizing the first reference section 32. The encoding convention may be as described with reference to FIGS. 2 or 3. At the fourth time interval, data block $B_2$ is written into the fifth system memory location while data block $C_0$ is encoded based on data block $A_0$. To encode data block $C_0$, which is represented by $C'_0$, portions of data block $A_0$ are retrieved from system memory and temporarily stored in the reference section of the local memory. Since data block $C_0$ is being encoded based on a relationship to data block $A_0$, the top portions of data block $A_0$ should be similar to the top portions of data block $C_0$. Similarly, the center portions of $A_0$ should be similar to the center portions of $C_0$, as well as the bottom portions of $C_0$. As such, only the portions of $A_0$ that are needed to encode data block $C_0$ are retrieved from system memory and stored in the reference section of the local memory. Since only a portion of data block $A_0$ is needed at any given time to encode $C_0$ the reference section of the local memory may be a fraction of a full-frame buffer, such as twenty to fifty percent of a full frame buffer.

At the next time interval, interval 5, data block $B_3$ is written into system memory section 6. At this time interval, data block $B_0$ is encoded based on data block $A_0$ and data block $C_0$. To encode data block $B_0$, portions of data block $A_0$ and portions of data block $C_0$ are retrieved from system memory 14 and stored in the reference section 34.

Having encoded data block $B_0$, it no longer needs to be maintained in the system memory. As such, at time interval 6, the next data block $C_1$ is stored in the second system memory location overwriting data block $B_0$. At this time interval, data block $B_1$ is encoded based on data block $A_0$ and data block $C_0$. At this point, the first grouping of data blocks have been encoded. As such, data block $A_0$ is no longer needed. Thus, at the next time interval, time interval 7, data block $A_0$ is overwritten by data block B4 in the first system memory location. In addition, at this time interval, data block $C_1$ is encoded based on data block $C_0$. The encoding process continues by reading in the next data block at the next time interval and overwriting data blocks that are no longer needed. The encoding process continues by retrieving the reference data blocks from system memory 14 and storing portions thereof in the reference section 34. Once all 16 data blocks have been encoded, an encoded output will be generated, which is shown at the bottom portion of FIG. 4.

Figure 5:
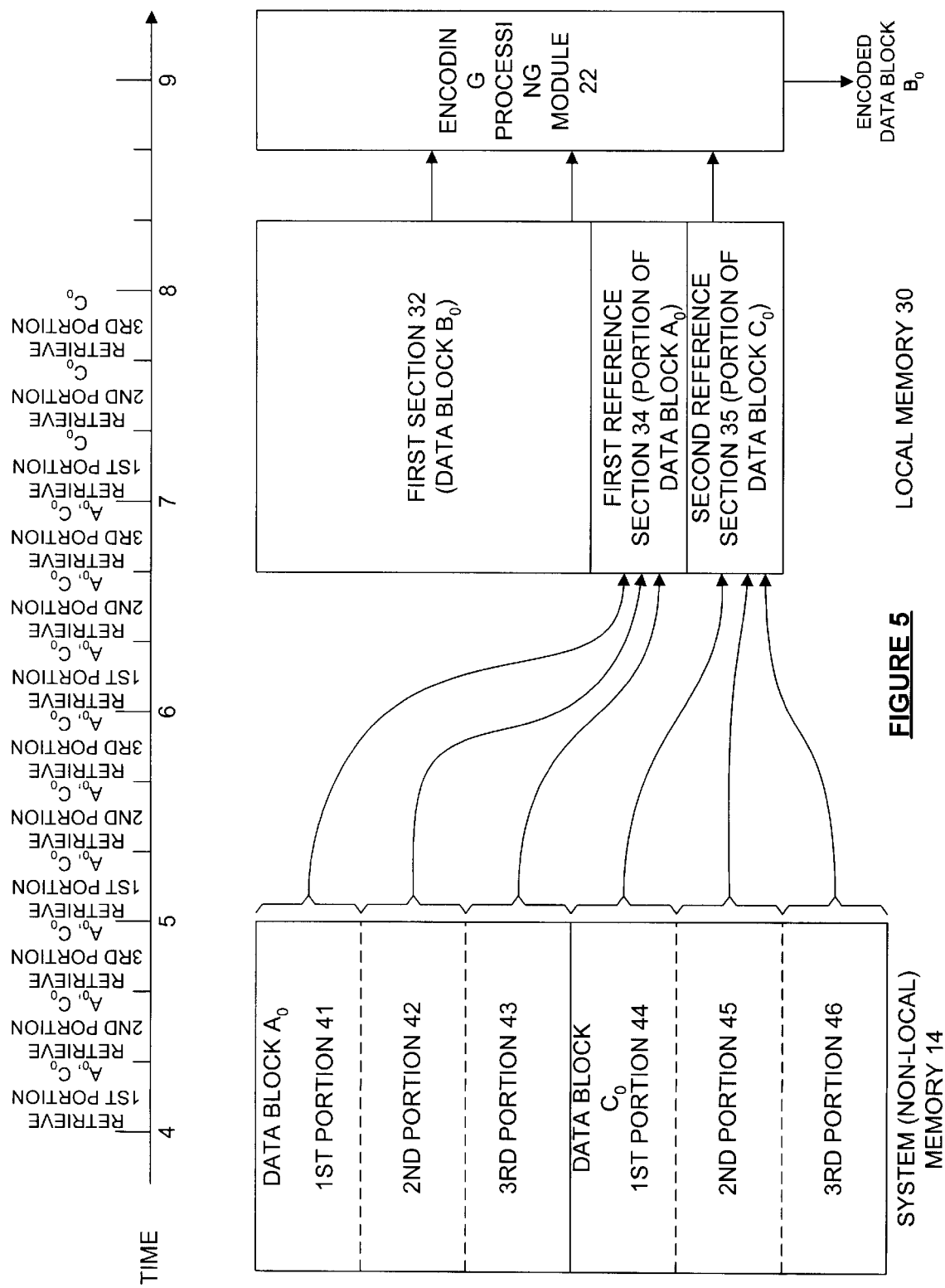
FIG. 5 illustrates a schematic block diagram of an encoding module in accordance with the present invention.

FIG. 5 illustrates a graphical representation of the retrieval of reference data blocks from the system memory. As shown, the encoding process relates to time intervals 4, 5, 6 and 7 of the illustration shown in FIG. 4. The local memory 30 includes the first buffer section 32, the first reference section 34 and a second reference section 35. For time interval 5, the first section 32 stores data block $B_0$, while the first reference section 34 stores portions of data block $A_0$ and the second reference section 35 stores portions of data block $C_0$.

For each time interval represented, the portions of the data block $A_0$, which include the first portion 41, the second portion 42 and the third portion 43, are retrieved from the system, or non-local, memory 14. As such, each portion 41–43 of the data block would be retrieved from the non-local memory 14 and provided to the local memory 30 within a given time interval. Similarly, data block $C_0$, which includes a first portion 44, a second portion 45, and a third portion 46, is retrieved in portions in any given time interval. The retrieval over each time interval and into subsequent time intervals is done in a circular manner. As such, the data block section in system memory 14 is constructed in a round robin, or circular buffer fashion. As one of average skill in the art will appreciate, data blocks $A_0$ and $C_0$ may include more or less portions than shown in FIG. 5.

As data block $B_0$ and the portions of data blocks $A_0$ and $C_0$ are in the local memory 30, the encoding processing module 22 retrieves the data from the local memory and processes it to encode data block $B_0$.

Figure 6:
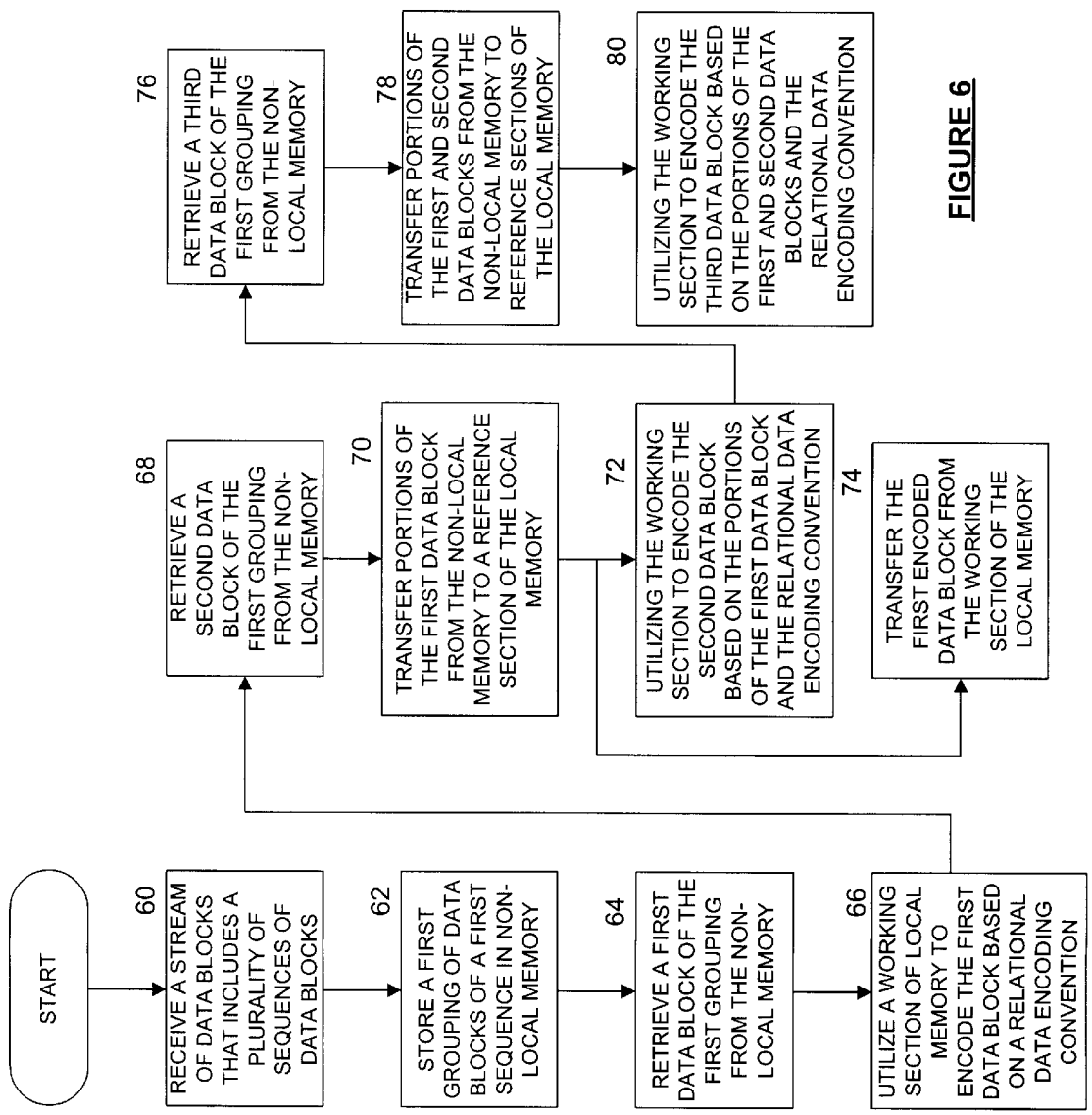
FIG. 6 illustrates a logic diagram of a method for encoding data blocks in accordance with the present invention.

FIG. 6 illustrates a logic diagram of a method for encoding a stream of data blocks. The process begins at step 60 where a stream of data blocks that includes a plurality of sequences of data blocks is received. The stream of data blocks may include a stream of video frames that have been provided from the central processing unit and/or a video capture device. Alternatively, the stream of data may represent images that are being moved across the screen in a drawing application wherein the images are encoded utilizing motion compensation, or some other relational encoding convention.

The process then proceeds to step 62 where a first grouping of data blocks of the first sequence is stored in non-local memory. The process then proceeds to step 64 where a first data block of the first grouping is retrieved from the non-local memory. The process then proceeds to step 66 where a working section of the local memory is utilized to encode the first data block based on a relational data encoding convention. Note that the relational data encoding convention may be the MPEG 2 encoding convention for video frames.

The process then proceeds to step 68 where a second data block of the first grouping of data blocks is retrieved from the non-local memory. The process then proceeds to step 70 where portions of the first data block are transferred from the non-local memory to a reference section of the local memory. This transferring may be done in a circular fashion as described above with reference to FIG. 5. The process then proceeds to step 72 where a working section of the local memory is utilized to encode the second data block based on the portions of the first data block and the relational data encoding convention. In addition, the process may perform step 74 where the first encoded data block is transferred from the working section of local memory. The first encoded data block may be transferred to a permanent storage device or a decoding module.

The process then proceeds to step 76 where a third data block of the first grouping is retrieved from the non-local memory. The process then proceeds to step 78 where portions of the first and second data blocks are transferred from the non-local memory to reference sections of the local memory. The process then proceeds to step 80 where the working section of the local memory is utilized to encode the third data block based on the portions of the first and second data blocks and the relational data encoding convention. Note that the encoding of the third data block may be done by producing Delta information wherein the Delta information indicates differences between the first data block and the third data block and differences between the second data block and the third data block.

Figure 7:
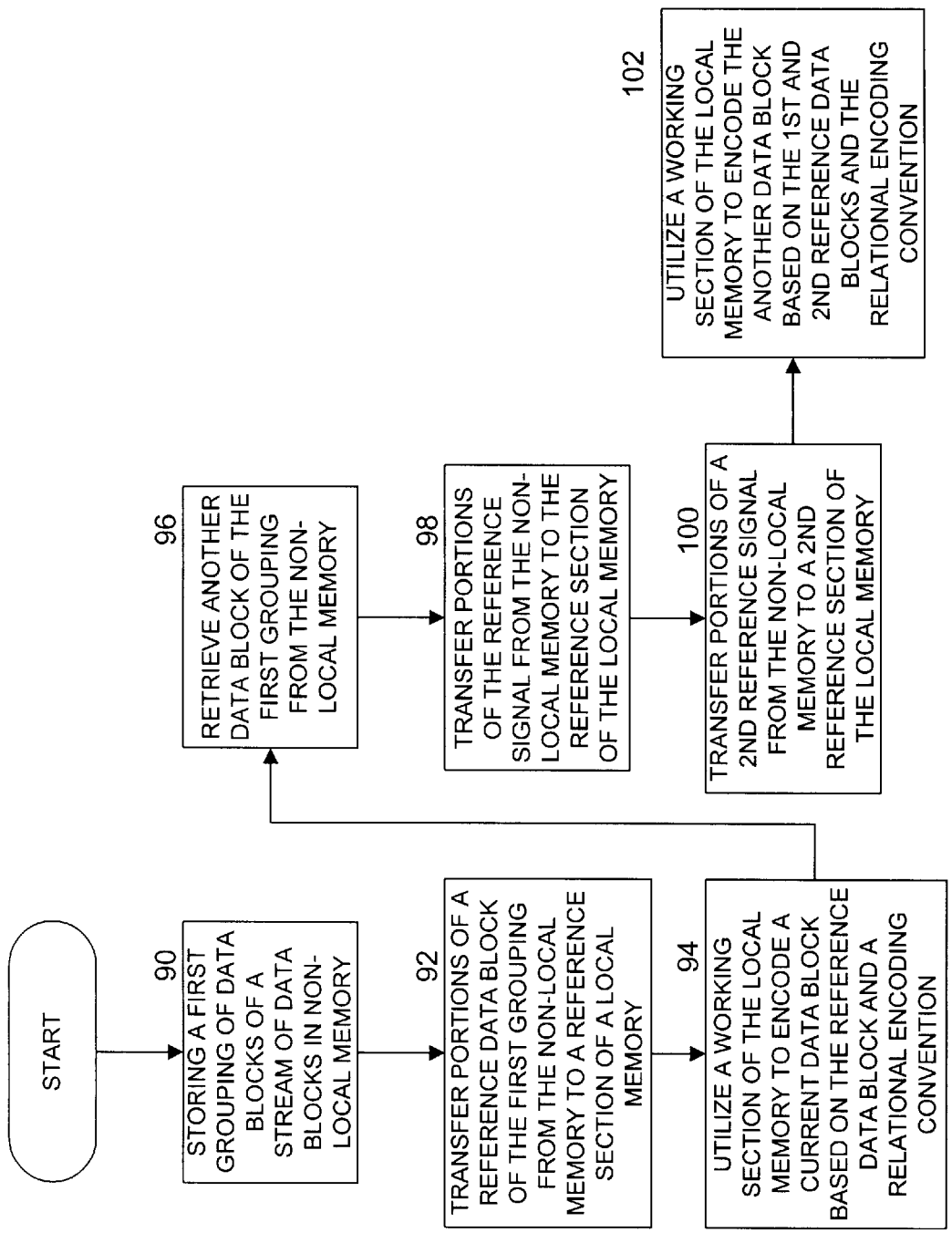
FIG. 7 illustrates a logic diagram of an alternate method for encoding data blocks in accordance with the present invention.

FIG. 7 illustrates a logic diagram of an alternate method for encoding data blocks. The process begins at step 90 where a first grouping of a stream of data blocks is stored in non-local memory. The process then proceeds to step 92 where portions of a reference data block of the first grouping is transferred from the non-local memory to a reference section of the local memory. The process then proceeds to step 94 where a working section of the local memory is utilized to encode a current data block based on the reference data block and a relational encoding convention.

The process then proceeds to step 96 where another data block of the first grouping of data blocks is retrieved from the non-local memory. The process then proceeds to step 98 where portions of the reference data block are transferred from the non-local memory to the reference section of the local memory. The process then proceeds to step 100 where portions of a second reference signal, or data block, are transferred from the non-local memory to a second reference section of the local memory. The process then proceeds to step 102 where the working section of the local memory is utilized to encode another data block based on portions of the first and second reference data blocks and the relational encoding convention.

Figure 8:
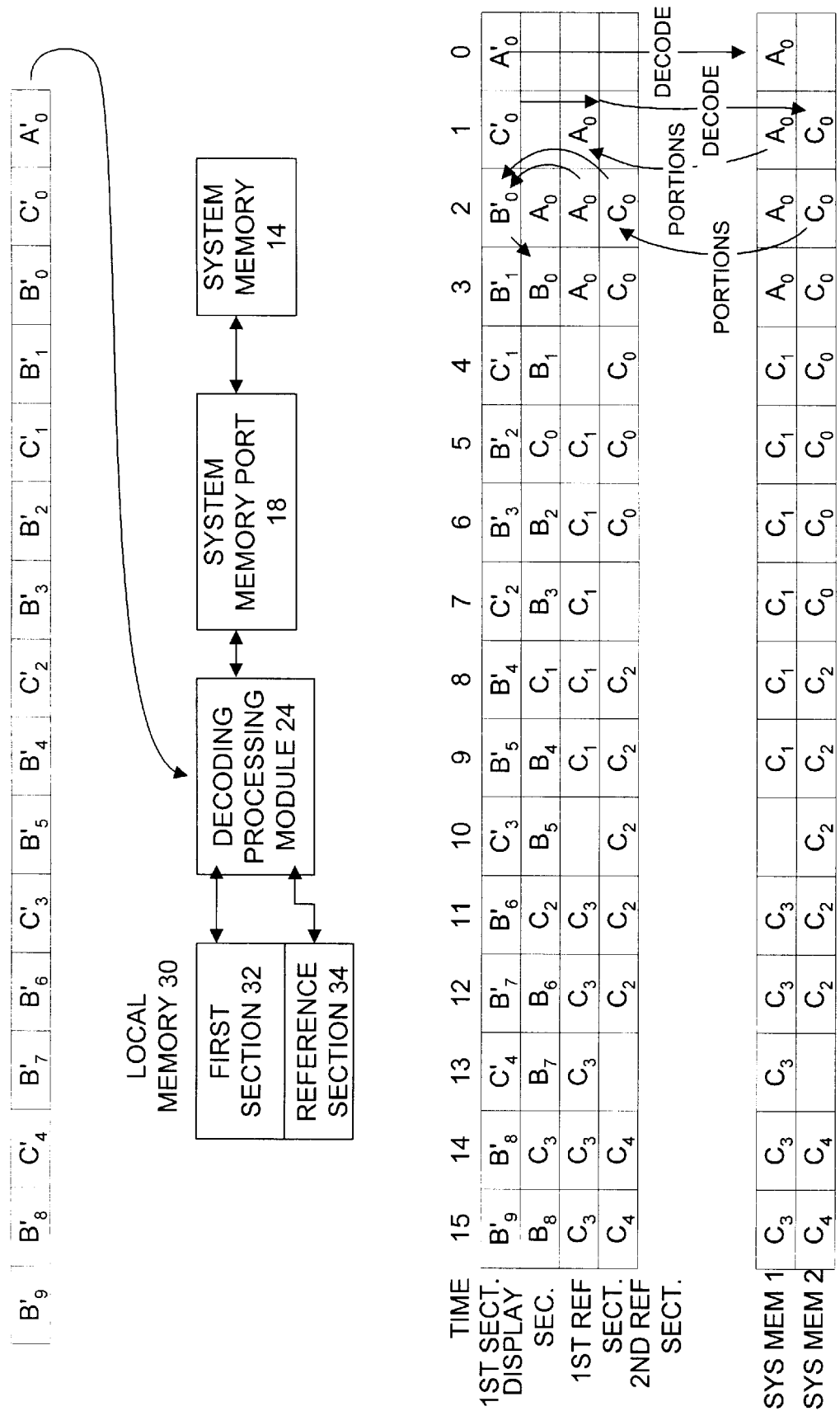
FIG. 8 illustrates a schematic block diagram of a decoding module and a graphical representation of memory utilization for decoding data in accordance with the present invention.

FIG. 8 illustrates a schematic block diagram of the decoding portion of the data processing system 10 of FIG. 1. The decoding portion includes the system memory 14, the system memory port 18, the decoding processing module 24, and the local memory 30. The local memory 30 includes a first section 32 and a reference section 34, where the first section 32 is larger than the reference section 34. In particular, the first section 32 may be of a sufficient size to store a full frame of video data, while the reference section stores less than fifty percent (50%) of a full frame of video data. Note that the decoding processing module 24 utilizes the system memory 14 and the local memory 30 in a similar manner as the encoding processing module 22, which was illustrated in FIG. 5. The illustration of FIG. 5 is equally applicable to the decoding processing module 24 when decoding an encoded stream of data blocks.

In the decoding process, the first memory section 32 includes two full-frame buffers, one for decoding a current data block and the second for displaying a recently decoded data block. In addition, the reference section 34 may include two reference sections. As the stream of encoded data blocks are received, the first encoded data block $A'_0$ is received and stored at time interval 0 in the first section of the local memory. During this time interval, data block $A'_0$ is decoded and the decoded representation $A_0$ is stored in a first section of the system memory. At the next time interval, time interval 1, the encoded data block $C'_0$ is stored in the first section. In addition, the decoded data block $A_0$ is retrieved, in portions, and provided to the first reference section. Based on the portions of data block $A_0$ stored in the first reference section and the relational decoding convention, data block $C'_0$ is decoded and stored in the second section of the system memory.

At the next time interval, time interval 2, encoded data block $B'_0$ is received and stored in the first section 32 of local memory 30. In addition, decoded data block $A_0$ is provided to the display section of local memory such that it may be provided to a display driver and ultimately displayed. In addition, portions of data block $A_0$ and $C_0$ are provided to the first and second reference sections of the local memory, 30 which are utilized to decode $B_0$.

At the next time interval, time interval 3, encoded data block $B'_1$ is stored in the first section 32 of local memory 30 while decoded data block $B_0$ is transferred to the display section of local memory 30. In addition, portions of data blocks $A_0$ and $C_0$ are transferred from the system memory 14 to the first and second reference sections. The portions of $A_0$ and $C_0$ are used to decode encoded data block $B'_1$.

At the next time interval, time interval 4, encoded data block $C'_1$ is received and stored in the first section 32 of local memory 30. Decoded data block $B_1$ is provided to the display section of the local memory 30 while portions of $C_0$ are transferred to the reference section 34 of the local memory 30 and utilized to decode data block $C'_1$. In addition, at time interval 4, the data block $A_0$ is overwritten in the system memory 14 with data block $C_1$.

The decoding process continues in a similar manner such that when encoded data blocks are received, they are stored in the first section 32 and portions of data blocks stored in system memory 14 are retrieved to decode the data blocks. Once all 16 encoded data blocks have been decoded, the original data stream has been recaptured. As one of average skill in the art can appreciate, the decoding process as illustrated in FIG. 8 allows the local memory to be substantially smaller than in previous embodiments. In previous embodiments, the reference data blocks would be fully stored in the local memory. In this embodiment, only portions of the reference data blocks are stored in local memory thereby reducing the size of memory required to decode encoded data blocks.

FIG. 9 illustrates a logic diagram of a method for decoding encoded data blocks in accordance with the present invention. The process begins at step 110 where a determination is made as to the encoding type of a received data block of a stream of data blocks, wherein the stream of data blocks has been encoded. The process then proceeds to step 112 where an answer to the inquiry of 110 is produced. If the encoding type of the received data block is of the first type, the process proceeds to step 114. At step 114 portions of a reference data block are transferred from non-local memory to a reference section of local memory. Having done that, the process proceeds to step 116 where a first section of the local memory is utilized to decode the received data block based on the portions of the reference data block stored in the reference section and a relational data decoding convention. The process then proceeds to step 118 where the decoded data block is transferred from the first section of the local memory to a second section of the local memory.

If the encoding type is not of the first type, the process proceeds to step 120. At step 120 a determination is made as to whether the encoding type is of a second type. If yes, the process proceeds to step 122 where portions of first and second reference data blocks are transferred from non-local memory to first and second reference sections of the local memory. The process then proceeds to step 124 where a first section of the local memory is utilized to decode the received data block based on the portions of the first and second reference data blocks and the relational decoding convention.

If the encoding type of the received data block is not of the first type or of the second type, the process proceeds to step 126. At step 126, the first section of the local memory is utilized to decode the received data block based on the relational data decoding convention. For example, if the stream of data includes video data that has been encoded based on the MPEG 2 motion compensation standard, data blocks of the first encoding type would be P video frames, data blocks of the second encoding type would be B type video frames and the third type of encoded frames would be I video frames.

The preceding discussion has presented a method and apparatus for encoding and decoding data blocks based on relational encoding and decoding conventions. By utilizing system memory to transfer portions of reference data blocks to local memory, current data blocks may be encoded and/or decoded in real time with minimal local memory requirements. As such, in a video graphics application, a video graphics circuit would require less memory to perform the MPEG encoding and/or MPEG decoding process.

What is claimed is:

1. A method for encoding a stream of data blocks, the method comprises the steps of:
    a) receiving a stream of data blocks, wherein the stream of data blocks includes a plurality of sequences of data blocks;
    b) storing a first grouping of data blocks of a first sequence of the plurality of sequences in non-local memory;
    c) retrieving a first data block of the first grouping of data blocks from the non-local memory;
    d) utilizing a working section of local memory to encode the first data block of the first grouping of data blocks based on a relational data encoding convention to produce a first encoded data block;
    e) retrieving a second data block of the first grouping of data blocks from the non-local memory;
    f) transferring portions of the first data block in a circular manner from the non-local memory to a reference section of the local memory, wherein the reference section is smaller than the working section;
    g) utilizing the working section of the local memory to encode the second data block based on the portions of the first data block and the relational data encoding convention to produce a second encoded data block;
    h) retrieving a third data block of the first grouping of data blocks from the non-local memory;
    i) transferring the portions of the first data block from the non-local memory to the reference section of the local memory;
    j) transferring portions of the second data block from the non-local memory to a second reference section of the local memory; and
    k) encoding the third data block based on the portions of the first and second data blocks and the relational data encoding convention to produce a third encoded data block.

2. The method of claim 1 further comprises, while encoding the second data block, transferring the first encoded data block from the working section of the local memory and storing the second encoded data block in the working section of the local memory.

3. The method of claim 2 further comprises transferring the first encoded data block to at least one of: permanent storage and a decoding module.

4. The method of claim 1 further comprises while encoding the third data block, transferring the second encoded data block from the working section of the local memory and storing the third encoded data block in the working section of the local memory.

5. The method of claim 1 further comprises encoding the third data block as delta information, wherein the delta information indicates differences between the first data block and the third data block and differences between the second data block and the third data block.

6. The method of claim 1, wherein the stream of data blocks comprise a stream of video frames.

7. The method of claim 6 further comprises receiving the stream of data blocks from a video capture device.

8. A method for encoding a stream of data blocks, the method comprises the steps of:
    a) storing a first grouping of data blocks of the stream of data blocks in non-local memory;
    b) transferring portions of a reference data block of the first grouping of data blocks from non-local memory to a reference section of a local memory;
    c) utilizing a working section of the local memory to encode a current data block based on the portions of the reference data block and a relational data encoding convention to produce an encoded data block, wherein the reference section is smaller than the working section;
    d) retrieving another data block of the first grouping of data blocks from the non-local memory;
    e) transferring the portions of the reference data block from the non-local memory to the reference section of the local memory;
    f) transferring portions of a second reference data block from the non-local memory to a second reference section of the local memory; and
    g) encoding the another data block based on the portions of the first and second data blocks and the relational data encoding convention to produce another encoded data block.

9. The method of claim 8 further comprises while encoding the another data block, transferring the encoded data block from the working section of the local memory.

10. The method of claim 9 further comprises encoding the another data block as delta information, wherein the delta information indicates differences between the another data block and the reference data block and differences between the another data block and the second reference data block.

11. An encoding system comprises:

a non-local memory port;

local memory having a working section and a reference section, wherein the reference section is smaller than the working section; and a processing module operably coupled to the non-local memory port and the local memory, wherein the processing module is operable to (a) receive a stream of data blocks, wherein the stream of data blocks includes a plurality of sequences of data blocks; (b) cause a first grouping of data blocks of a first sequence of the plurality of sequences to be stored in non-local memory via the non-local memory port; (c) cause a first data block of the first grouping of data blocks to be retrieved from the non-local memory via the non-local memory port; (d) utilize the working section of local memory to encode the first data block of the first grouping of data blocks based on a relational data encoding convention to produce a first encoded data block; (e) cause a second data block of the first grouping of data blocks to be retrieved from the non-local memory via the non-local memory port; (f) cause portions of the first data block to be transferred from the non-local memory via the non-local memory port to the reference section of the local memory; and (g) utilize the working section of the local memory to encode the second data block based on the portions of the first data block and the relational data encoding convention to produce a second encoded data block wherein the processing module is further operable to cause the first encoded data block to be transferred from the working section of the local memory, while encoding the second data block;

cause a third data block of the first grouping of data blocks to be retrieved from the non-local memory;

cause the portions of the first data block to be transferred from the non-local memory to the reference section of the local memory;

cause portions of the second data block to be transferred from the non-local memory to a second reference section of the local memory; and encode the third data block based on the portions of the first and second data blocks and the relational data encoding convention to produce a third encoded data block.

12. The encoding system of claim 11, wherein the processing module is further operable to encode the third data block as delta information, wherein the delta information indicates differences between the first data block and the third data block and differences between the second data block and the third data block.

13. An encoding system comprises:

a non-local memory port;

local memory having a working section and a reference section, wherein the reference section is smaller than the working section; and a processing module operably coupled to the non-local memory port and the local memory, wherein the processing module is operable to (a) cause a first grouping of data blocks of the stream of data blocks to be stored in non-local memory via the non-local memory port; (b) cause portions of a reference data block of the first grouping of data blocks to be transferred in a circular manner from the non-local memory to the reference section of a local memory; and (c) utilize the working section of the local memory to encode a current data block based on the portions of the reference data block and a relational data encoding convention to produce an encoded data block, wherein the reference section is smaller than the working section; and wherein the processing module is further operable to:

cause another data block of the first grouping of data blocks to be retrieved from the non-local memory;

cause the portions of the reference data block to be transferred from the non-local memory to the reference section of the local memory;

cause portions of a second reference data block to be transferred from the non-local memory to a second reference section of the local memory; and encode the another data block based on the portions of the first and second data blocks and the relational data encoding convention to produce another encoded data block.

14. The encoding system of claim 13, wherein the processing module is further operable to cause the encoded data block to be transferred from the working section of the local memory while encoding the another data block.

15. The encoding system of claim 14, wherein the processing module is further operable to encode the another data block as delta information, wherein the delta information indicates differences between the another data block and the reference data block and differences between the another data block and the second reference data block.

16. A computer system having data block encoding functionality, the computer system comprises:

a data capture module operably coupled to receive a stream of data blocks;

local memory having a working section and a reference section, wherein the reference section is smaller than the working section;

system memory;

a system memory port operably coupled to the system memory;

a central processing unit operably coupled to the system memory; and an encoding module operably coupled to the local memory, the system memory port and the data capture module, wherein the encoding module is operable to (a) cause a first grouping of data blocks of the stream of data blocks to be stored in the system memory via the system memory port; (b) cause portions of a reference data block of the first grouping of data blocks to be transferred from the system memory to the reference section of a local memory; and (c) utilize the working section of the local memory to encode a current data block based on the portions of the reference data block and a relational data encoding convention to produce an encoded data block, wherein the reference section is smaller than the working section, and wherein the encoding module is further operable to:

cause another data block of the first grouping of data blocks to be retrieved from the system memory;

cause the portions of the reference data block to be transferred from the system memory to the reference section of the local memory;

cause portions of a second reference data block to be transferred from the system memory to a second reference section of the local memory; and encode the another data block based on the portions of the first and second data blocks and the relational data encoding convention to produce another encoded data block.

17. The computer system of claim 16, wherein the encoding module is further operable to cause the encoded data block to be transferred from the working section of the local memory while encoding the another data block.

18. The computing system of claim 17 wherein the encoding module is further operable to encode the another data block as delta information, wherein the delta information indicates differences between the another data block and the reference data block and differences between the another data block and the second reference data block.

* * * * *